United States Patent Office 2,895,750
Patented July 21, 1959

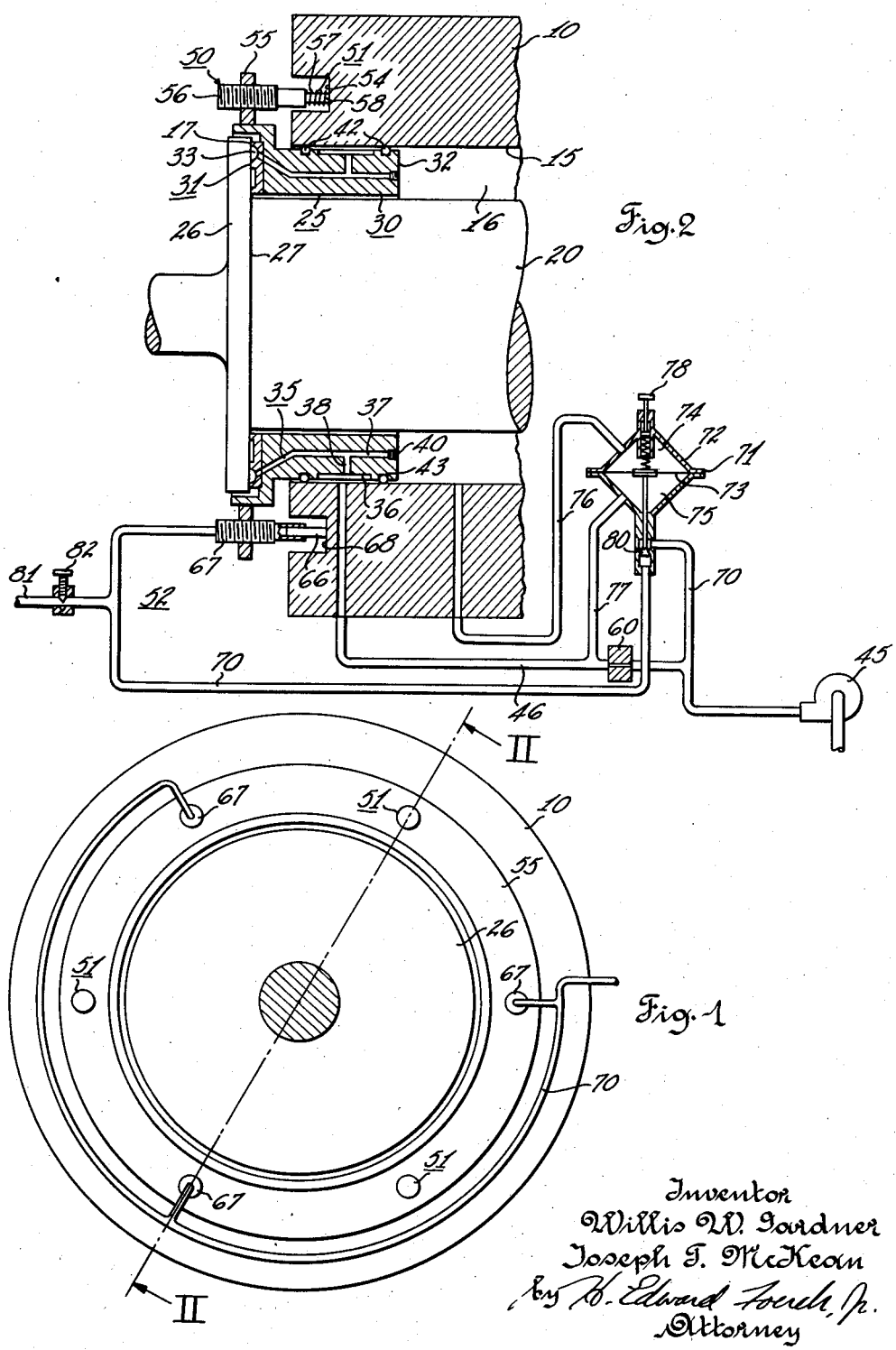

2,895,750

AUTOMATIC THRUST DEVICE FOR HYDROGEN SEAL

Willis W. Gardner, West Allis, and Joseph T. McKean, Waukesha, Wis., assignors to Allis-Chalmers Manufacturing Company, Milwaukee, Wis.

Application September 27, 1957, Serial No. 686,728

4 Claims. (Cl. 286—9)

This invention relates to hydrostatically balanced hydrogen seals. More particularly, this invention relates to means providing a supplemental biasing thrust on the seal ring of a hydrostatically balanced hydrogen seal for turbogenerators.

Modern turbogenerators operate with a cooling gas of light density, such as hydrogen, contained at a pressure above atmospheric within the machine housing. In order to contain the gas within the housing a seal is necessary between the housing and the rotatable member.

In a preferred type of hydrogen seal, such as the hydrostatically balanced seal described in Ringland, S.N. 658,706, filed May 13, 1957, a nonrotatable seal ring is provided having a radial surface which opposes a radial surface on a flange on the rotatable member of the machine. O-rings or similar sealing devices are positioned between the seal ring and machine housing to provide a seal while permitting axial movement of the seal ring relative to the housing.

The forces on the seal ring providing the hydrostatic balance comprise an axial gas force provided by the cooling gas within the machine housing acting against a net area of the seal ring producing a force tending to move the seal ring toward the shaft flange, and an opposing axial oil force provided by oil supplied to a groove in the radial surface of the seal ring producing a force tending to move the seal ring away from the shaft flange. The surface of the seal ring is proportioned such that when the gas pressure in the machine housing and the oil pressure in the groove are equal the respective axial forces are equal. A small constant biasing force is provided tending to move the seal ring toward the shaft flange so that when the opposing axial forces on the seal ring are equal, the oil pressure exceeds the gas pressure by a small differential thereby preventing gas from escaping between opposing surfaces. This differential is kept small, such as five pounds per square inch, to limit the tendency of oil to flow from the seal ring groove radially inward into the machine housing.

The oil which flows at least outwardly between the surfaces of the seal ring and the shaft flange from the seal ring groove is supplied to the seal ring groove by a source which causes a predetermined flow at whatever pressure is required to produce the predetermined flow. This pressure is great enough to produce a force equal to the sum of the gas force and the biasing force to lift the seal ring off the shaft flange and cause the oil to flow between the seal surfaces.

Since the groove oil pressure is dissipated as at pressure drop in the oil flowing from the groove radially outward between the seal surfaces, the distance between the seal surfaces, or oil film thickness, which determines the pressure drop for a predetermined flow also determines the groove oil pressure necessary to maintain the flow. The tendency of the gas and biasing forces to move the seal ring toward the shaft flange and thereby decrease the oil film thickness is opposed by the tendency of the groove oil pressure to increase with any decrease in film thickness in order to maintain the same oil flow. Therefore, the seal ring will tend to position itself to provide a film thickness and groove oil pressure which will maintain a hydrostatic balance of forces on the seal ring for all housing pressures.

During normal generator operation, the shaft of the rotating member expands and contracts changing the position of the shaft flange. Also, the housing gas pressure may be increased or decreased because of changed cooling requirements. Under these conditions the seal ring must move to follow the shaft flange or must move to establish an equilibrium at a changed groove oil pressure corresponding to the changed gas pressure. However, movement of the seal ring depends upon there being a force unbalance which is sufficient to overcome any friction in the O-rings between the axially movable seal ring and the housing. Because of the small differential of oil pressure over gas pressure selected to seal the gas in the machine housing, the permissible increase in gas pressure relative to oil pressure while maintaining a seal is limited, and the resulting force unbalance tending to move the seal ring toward the flange may be insufficient to overcome the friction of the O-rings.

According to the present invention means are provided causing a supplemental biasing thrust in addition to the constant biasing thrust and tending to move the seal ring toward the shaft flange whenever the oil pressure in the seal ring groove drops below a predetermed differential above the housing gas pressure. This biasing means comprises a differential pressure valve supervised by the groove oil pressure and the housing gas pressure. The differential valve admits oil at a desired pressure to hydraulic pistons positioned between the seal ring and the machine housing whenever the differential of oil pressure over gas pressure drops below a predetermined amount to provide a force sufficient to overcome any friction of the O-rings and move the seal ring toward the shaft flange. Movement of the seal ring toward the shaft flange increases the pressure drop for a predetermined flow between the seal surfaces and increases the groove oil pressure to an amount equal to the pressure drop. Once the groove oil pressure has increased and a proper differential of groove oil pressure to housing gas pressure is reestablished, the differential valve closes and stops the flow of oil to the pistons. A needle valve is provided to relieve the oil pressure in the hydraulic pistons and remove any residual biasing force.

Therefore, it is an object of the present invention to provide an improved hydrostatically balanced hydrogen seal in which a supplemental biasing thrust is provided.

Another object of the present invention is to provide an improved hydrostatically balanced seal in which a minimum pressure differential oil pressure over gas pressure is maintained for all gas pressures.

Other objects and advantages of the present invention will be apparent from the following description taken in connection with the accompanying drawing, in which:

Fig. 1 is an end view of the seal ring of a hydrogen seal embodying the present invention; and Fig. 2 is a sectional view of the seal shown in Fig. 1 taken along line II—II, and a schematic showing of the hydraulic systems for supplying a supplemental biasing system force to the seal ring.

Referring more particularly to Fig. 2 of the drawing, a portion of a housing 10 for a dynamoelectric machine is shown having an opening 16 through which a rotor shaft 20 extends. Rotor shaft 20 is suitably supported by bearings, not shown, and is rotated at a high speed, such as 3600 r.p.m.

Seal means 25 is provided at both ends of the rotor at the point at which shaft 20 passes through opening 16 of the housing 10, only one end being shown for convenience. Housing 10 is thus made gas tight about the rotor shaft 20 and contains a cooling gas such as hydrogen at any desired pressure which may be, for example, atmospheric pressure or 75 pounds above atmospheric.

Seal means 25 comprises a flange 26 provided on shaft 20 at a point at which it is desired to provide a gas seal between the stationary housing 10 and the rotor shaft 20. Flange 26 extends radially outward and presents an annular radially extending surface 27.

Seal means 25 also comprises a seal ring 30 provided with an annular radial surface 31 opposing the annular surface 27 of the rotating flange. The seal ring 30 is constructed such that the hydrogen within the generator acts on a net area 32 causing a force tending to move the seal ring 30 toward the shaft flange 26.

Seal ring 30 includes a groove 33 in the surface 31 of the seal ring and duct means 35 for conducting lubricating oil to groove 33. Duct means 35 extend from the groove 33 to an annular fluid supply chamber 36 in the outer circumference of the seal ring 30 and comprise a plurality of axially extending duct portions 37 formed as by boring and a plurality of radially extending duct portions 38. A plug 40 is provided to close the end of the axial portion 37 to prevent oil from entering the machine housing 10.

The proportioning of the annular groove 33 and the seal surface 31 is such that when the oil pressure in the groove 33 is equal to the hydrogen pressure in the machine housing 10, the oil force on the seal ring 30 is equal to the hydrogen pressure force on the seal ring. This condition is met when a projection of the surface 15 of housing 10 bisects the outer portion 17 of the radial surface 31 between the groove 33 and the periphery of the surface 31. The depth of groove 33 and the number and position of duct means 35 is such as to provide a uniform distribution of oil pressure around the circumference of the seal ring 30.

To permit axial movement of seal ring 30 and to seal against hydrogen leakage from the machine housing between the housing 10 and the seal ring 30, O-rings 42 are positioned in suitable annular recesses 43 formed in the periphery of the seal ring 30. Recesses 43 are spaced on opposite sides of fluid supply chamber 36 to prevent leakage of lubricating oil in either direction from the supply chamber along the joint between the seal ring 30 and housing 10.

Means are provided for supplying lubricating oil under pressure to annular groove 33 in the surface 31 of the seal ring. These means include a pump 45 which is shown externally of the machine. Pump 45 forces lubricating oil through a duct 46 to annular chamber 36. The oil then flows through duct means 35 to the groove 33.

Pump means 45 may preferably be a constant flow pump supplying lubricating oil at whatever pressure is required to maintain the constant flow. Thus, except for changes in velocity of flow between the seal face, that is, between surface 27 of the flange 26 and surface 31 of the seal ring 30, the oil film thickness will remain substantially constant. The groove pressure supplied by the pump must be sufficient to lift the seal ring surface off the surface of the flange and permit the selected flow of oil to escape therebetween.

It is usual in dynamoelectric construction to supply the hydrogen seal oil from the main oil pump which furnishes lubricating oil to the turbine and generator bearings. Because such a pump is usually a centrifugal pump supplying a large volume of lubricating oil at a high pressure, means are provided in such arrangement to limit the oil flow to the seal and to limit the groove pressure to provide a desired oil film thickness between the seal faces. This means comprises an orifice 60 provided in the oil supply duct 46. Orifice 60 may comprise a fixed diameter orifice providing a range of predetermined flows at a range of pressures, or a constant flow orifice providing a constant flow at a range of pressures. The orifice reduces the oil flow to the groove to a desired amount and causes a pressure drop to provide a groove pressure necessary to maintain the flow.

Biasing means 50 are provided on the seal ring 30 causing a thrust force tending to move the seal ring 30 toward the shaft flange 26. This biasing means 50 comprises a constant biasing force provided by spring assemblies 51 and comprises a supplemental thrust force provided by a hydraulic system 52. The spring assemblies 51 providing the constant bias are positioned at several points around the periphery of the seal ring 30 between the recess 54 in the machine housing 10 and an annular flange 55 extending radially from the seal ring 30. Spring assemblies 51 comprise sleeve portions 56 which are adjustably attached to flange 55 for varying the tension on springs 57. Springs 57 are shown as helical springs with a centering stud 58 slidably coacting with sleeve portions 56 for holding the spring between sleeve portion 57 and recess 54 of the housing 10.

The spring assemblies 51 are adjusted to provide the desired differential bias of oil pressure in groove 33 above hydrogen pressure in housing 10 at equilibrium conditions. This bias is preferably small but it is sufficient to provide a seal between the surfaces of the flange 26 and seal ring 30. Thus, at equilibrium the differential of the oil pressure in groove 33 over the gas pressure in housing 10 is small and there is little tendency of the oil to flow into the machine housing. The radially inner portion of the seal ring surface 31 may then be proportioned such that at rated conditions the centrifugal effect of the oil film between the surface 31 and the surface 26 of the flange is equal to the differential of the oil pressure in groove 33 over the hydrogen pressure in housing 10 to substantially eliminate oil flow into the hydrogen side of the seal.

Also, because of the small differential of oil pressure over gas pressure, the permissible increase in gas pressure relative to oil pressure while maintaining a seal is limited. Therefore, a force unbalance caused by any relative increase in gas pressure is also limited.

According to the present invention, supplemental thrust force means 52 are provided causing a force tending to move seal ring 30 toward the shaft flange to decrease the film thickness and increase the groove oil pressure whenever the differential of oil pressure over gas pressure falls below a predetermined amount. Supplemental thrust force means 52 comprises hydraulic pistons 66 and sleeves 67. Sleeves 67 are firmly held by radial flange 55 and are shown in Fig. 1 positioned alternately with the spring assemblies 51. Pistons 66 slidably engage sleeves 67 and the free end thereof bears against housing 10 in recesses 68.

Means are provided for supplying oil under pressure to the hydraulic pistons 66 when the conditions on the seal ring 30 are such as to require an additional force tending to move the seal ring 30 toward the shaft flange 26. These means include a duct 70 connecting the oil supply duct 46 to the sleeves 67. A differential valve 71 controls the flow of oil through duct 70.

Differential valve 71 is shown comprising a housing 72 and a diaphragm 73 forming a first chamber 74 and a second chamber 75. First chamber 74 is connected by a duct 76 to the interior of the machine housing 10 to permit communication of the hydrogen in the machine with the first chamber 74 and cause a gas pressure in the first chamber 74 which corresponds to the hydrogen gas pressure in the machine housing 10. Second chamber 75 is connected by a duct 77 to duct 46 on the seal side of orifice 60 to produce a pressure in the second chamber 75 which corresponds to the oil pressure in the groove 33. Adjustable spring means 78 are provided for selectively biasing diaphragm 73 for various differentials of oil pressure in groove 33 over gas pressure in housing 10. A valve 80 is connected to diaphragm 73 and its position is controlled by the diaphragm. Valve 80 controls the flow of oil through the differential valve 71. In this manner differential valve 71 is adjusted to permit oil to flow through duct 70 to the sleeve 67 whenever the oil pressure in the groove 33 falls below a preselected differential above the gas pressure in the machine 10.

A drain duct 81 and needle valve 82 are provided for duct 70 to relieve the oil pressure in the sleeves 67 whenever valve 80 is closed. Needle valve 82 remains sufficiently opened to immediately relieve the pressure in sleeve 67, but it is also sufficiently closed to cause the variable force provided by hydraulic system 52 to be proportional to the unbalance of the pressures on diaphragm 73.

In operation of the seal, hydrogen gas pressure in the machine housing 10 acting on area 32 causes a force on the seal ring which together with the constant biasing force provided by the spring assemblies 51 tends to move the seal ring 30 toward the shaft flange 26. These forces are hydrostatically balanced by oil pressure in the seal ring groove 33 providing a force tending to move the seal ring away from the shaft flange 26.

Lubricating oil is supplied to the seal ring groove 33 at whatever pressure is required to lift the seal ring off the shaft flange and permit a desired flow to pass between the seal surfaces. The forces on the seal ring tending to reduce the oil film thickness are opposed by the increase in groove oil pressure with any decrease in film thickness. For example, an increment decrease in film thickness and flow between the seal surfaces causes a decrease in pressure drop across the fixed diameter or constant flow orifice 60 thereby increasing the groove oil pressure. Similarly, any increase in flow or film thickness causes a decrease in groove oil pressure. Therefore, a hydrostatic balance is maintained provided the seal ring is free to move responsive to any unbalance of forces on the seal ring.

The supplemental biasing thrust force of the present invention provides an additional force tending to move the seal ring toward the shaft flange whenever the oil pressure in groove 33 drops below a predetermined amount above the gas pressure in housing 10 thereby assuring a seal at all times. The differential valve 71 opens responsive to the drop in oil pressure in groove 33 below the predetermined differential above the gas pressure and permits high pressure oil to flow through duct 70 to sleeves 67 and cause piston 66 to force the seal ring 30 toward the flange 26 thus overcoming the friction of O-rings 42 until the position of the seal ring 30 relative to flange 26 is such as to reestablish the hydrostatic balances of forces on seal ring 30.

When the oil pressure in the groove 33 has risen above the predetermined differential above the gas pressure in housing 10, the differential valve 71 closes and the pressure in the sleeves 67 is relieved through the needle valve 82.

Other variations or modifications may be made in the embodiment of the invention shown by one skilled in the art without departing from the spirit of the invention or from the scope of the appended claims. It is also obvious that the seal is adaptable to other apparatus where it is desired to seal against gas leakage between relative rotating members.

What is claimed is:

1. In a dynomolectric machine, a housing containing a gas under pressure, a rotatable shaft including a flange having an annular surface, means providing a seal for said gas between said flange and said housing comprising an axially movable annular seal member having an annular surface opposing said surface of said flange, an annular groove in said surface of said seal member, force means including a constant biasing means tending to move said seal member toward said flange, means supplying a fluid under pressure between said surfaces to cause a force tending to move said seal member away from said flange whereby said fluid flows between said surfaces and provides a predetermined film thickness therebetween, means responsive to changes in said film thickness adjusting said fluid pressure in said groove to provide a hydrostatic equilibrium of said forces on said seal member, variable biasing means responsive to pressure differentials below a predetermined differential between said fluid pressure in said groove and said gas pressure in said housing providing an additional force tending to move said seal ring toward said flange.

2. In a dynamoelectric machine, a housing containing a gas under pressure, a rotatable shaft including a flange having an annular surface, means providing a seal for said gas between said flange and said housing comprising an axially movable annular seal member having an annular surface opposing said surface of said flange, an annular groove in said surface of said seal member, said seal member presenting a net area to said gas pressure in said machine to cause a force on said seal member tending to move said seal member toward said flange, biasing means on said seal member providing a constant force tending to move said seal member toward said flange, means supplying a fluid under pressure to said groove to cause a force tending to move said seal member away from said flange and to cause said fluid to flow between said surfaces providing a predetermined oil film thickness therebetween, said surface of said seal member being proportioned to present a net area to said oil pressure substantially equal to the net area presented to the gas pressure, means responsive to changes in said film thickness adjusting said fluid pressure in said groove to provide a continuous hydrostatic equilibrium of said forces on said seal member, variable biasing means responsive to pressure differentials below a predetermined differential between said oil pressure and said gas pressure to provide an additional force tending to move said seal ring toward said flange.

3. In a dynamoelectric machine, a housing containing a gas under pressure, a rotatable shaft including a flange having an annular surface, means providing a seal for said gas between said flange and said housing comprising an axially movable annular seal member having an annular surface opposing said surface of said flange, an annular groove in said surface of said seal member, said seal member presenting a net area to said gas pressure in said machine to cause a force on said seal member tending to move said seal member toward said flange, constant biasing means providing a force tending to move said seal member toward said flange, means supplying a fluid under pressure to said annular groove causing a force tending to move said seal member away from said flange and to cause said fluid to flow between said surfaces providing a predetermined film thickness therebetween, said surface of said seal member being proportioned to cause said fluid force to be equal to said gas force when said fluid and gas pressures are equal, means responsive to changes in said film thickness adjusting said fluid pressure in said groove to provide a continuous hydrostatic equilibrium of said forces on said seal member, means including hydraulic pistons positioned between said housing and said seal member responsive to pressure differentials below a predetermined differential between said oil pressure in said groove and said gas pressure in said housing providing a variable biasing force tending to move said seal ring toward said flange.

4. In a dynamoelectric machine, a housing containing a gas under pressure, a rotatable shaft including a flange having an annular surface, means providing a seal for said gas between said flange and said housing comprising an axially movable annular seal member having an annular surface opposing said surface of said flange, an annular groove in said surface of said seal member, said seal member presenting a net area to said gas pressure to cause a force tending to move said seal member toward said flange, biasing means providing a constant force ending to move said seal member toward said flange, means supplying a fluid under pressure to said groove to cause a force tending to move said seal member away from said flange and to cause said fluid to flow between said surfaces providing a predetermined film thickness therebetween, said surface of said seal member being proportioned to provide a force substantially equal to said force provided by said gas pressure when said oil and gas pressures are equal, means responsive to changes in said film thickness adjusting said fluid pressures in said groove to provide a continuous hydrostatic equilibrium of said forces on said seal member, variable biasing means providing a variable force tending to move said seal ring toward said flange, said variable biasing means comprising hydraulic pistons positioned between said seal ring and said housing, duct means connecting said pistons to said fluid supply means, and a differential pressure valve in said duct means responsive to pressure differentials between said oil pressure and said gas pressure below a predetermined differential to admit high pressure fluid from said source to said pistons, means relieving said fluid pressure from said cylinders when said differential valve closes.

References Cited in the file of this patent

UNITED STATES PATENTS

| | | |
|---|---|---|
| 2,265,953 | Mortenson et al. | Dec. 9, 1941 |
| 2,834,619 | McNab | May 13, 1958 |

FOREIGN PATENTS

| | | |
|---|---|---|
| 660,051 | Great Britain | Oct. 31, 1951 |
| 690,569 | Great Britain | Apr. 22, 1953 |